(12) United States Patent
Inoue et al.

(10) Patent No.: US 12,242,579 B2
(45) Date of Patent: Mar. 4, 2025

(54) AUTHENTICATION SYSTEM, METHOD, AND COMPUTER-READABLE RECORDING MEDIUM

(71) Applicant: NEC Corporation, Tokyo (JP)

(72) Inventors: Junichi Inoue, Tokyo (JP); Takumi Otani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 17/784,734

(22) PCT Filed: Dec. 26, 2019

(86) PCT No.: PCT/JP2019/051075
§ 371 (c)(1),
(2) Date: Jun. 13, 2022

(87) PCT Pub. No.: WO2021/130948
PCT Pub. Date: Jul. 1, 2021

(65) Prior Publication Data
US 2023/0011336 A1  Jan. 12, 2023

(51) Int. Cl.
*G06F 21/32* (2013.01)
*G06F 11/34* (2006.01)
*G06Q 50/40* (2024.01)

(52) U.S. Cl.
CPC .......... *G06F 21/32* (2013.01); *G06F 11/3438* (2013.01); *G06Q 50/40* (2024.01)

(58) Field of Classification Search
None
See application file for complete search history.

(56) References Cited

U.S. PATENT DOCUMENTS 8,816,818 B2 * 8/2014 Yamada ............. G06V 40/1365
340/5.82
10,136,320 B1 * 11/2018 Sugawara ........... H04W 12/068
(Continued)

FOREIGN PATENT DOCUMENTS

CN 101226653 A 7/2008
EP 3787225 A1 3/2021
(Continued)

OTHER PUBLICATIONS

International Search Report for PCT Application No. PCT/JP2019/051075, mailed on Mar. 10, 2020.
(Continued)

*Primary Examiner* — Philip J Chea
*Assistant Examiner* — Bin Qing Zheng
(74) *Attorney, Agent, or Firm* — Sughrue Mion, PLLC

(57) ABSTRACT

Provided is an authentication system that improves user convenience. This authentication system includes at least one first terminal, a plurality of second terminals, and a server device. The first terminal is capable of providing services using a biometric authentication function or non-biometric authentication function. Each of the second terminals is capable of switching between a biometric authentication function and a non-biometric authentication function and capable of providing services using the biometric authentication function or non-biometric authentication function. The server device is connected to the first terminal and the plurality of second terminals. The server device calculates the rate of usage of a biometric authentication function by the at least one first terminal. The server device determines an operation mode for at least one of the plurality of second terminals on the basis of the calculated rate of usage.

14 Claims, 10 Drawing Sheets

(56) References Cited

U.S. PATENT DOCUMENTS

| | | | |
|---|---|---|---|
| 2019/0114563 A1* | 4/2019 | Yukimoto | ................ G07C 9/00 |
| 2020/0042812 A1* | 2/2020 | Sakaguchi | ......... G06Q 10/0635 |
| 2020/0118369 A1 | 4/2020 | Sakaguchi et al. | |
| 2020/0128021 A1* | 4/2020 | Jiang | ................... H04L 63/0861 |
| 2020/0134520 A1* | 4/2020 | Kantor | ................... G07C 11/00 |
| 2022/0027443 A1* | 1/2022 | Chae | ................... H04L 63/0861 |
| 2024/0338967 A1 | 10/2024 | Kochi et al. | |

FOREIGN PATENT DOCUMENTS

| | | | | | |
|---|---|---|---|---|---|
| JP | 2007-079656 | A | | 3/2007 | |
| JP | 2008-507790 | A | | 3/2008 | |
| JP | 2012048520 | A | * | 3/2012 | ............. G06F 21/32 |
| JP | 2019-124999 | A | | 7/2019 | |
| WO | 2005/055151 | A1 | | 6/2005 | |
| WO | 2009/075180 | A1 | | 6/2009 | |
| WO | 2016/129454 | A1 | | 8/2016 | |
| WO | 2019/102362 | A1 | | 5/2019 | |
| WO | 2020/075280 | A1 | | 4/2020 | |

OTHER PUBLICATIONS

English translation of Written opinion for PCT Application No. PCT/JP2019/051075, mailed on Mar. 10, 2020.
Extended European Search Report for EP Application No. 19958026.7, dated on Nov. 16, 2022.
SG Official Communication for SG Application No. 11202203641U, mailed on Dec. 25, 2024.
Machine translation of WO2016/129454A1.
Machine translation of CN101226653A.

* cited by examiner

Fig.6

| FACE AUTHENTICATION USE RATE | NUMBER OF TERMINALS OF FACE AUTHENTICATION SETTING |
|---|---|
| 90% – | A1 |
| 80% – 90% | A2 |
| 70% – 80% | A3 |
| ... | ... |

AUTHENTICATION SYSTEM, METHOD, AND COMPUTER-READABLE RECORDING MEDIUM

This application is a National Stage Entry of PCT/JP2019/051075 filed on Dec. 26, 2019, the contents of all of which are incorporated herein by reference, in their entirety.

TECHNICAL FIELD

The present disclosure relates to an authentication system, a method, and a program.

BACKGROUND ART

Services using face authentication have started to spread. For example, face authentication has started to be applied to various procedures (for example, check in, baggage check, security check, and the like) at airports.

For example, PTL 1 discloses a configuration in which a flow of a series of procedures from check in to boarding is performed by a passenger himself/herself in a security booth. In the technique disclosed in PTL 1, traceability check of passengers is performed by a network camera installed in an airport. In the traceability check, an image of the passenger captured by the network camera in any place in the airport is collated with an image including a face image of the passenger stored as personal authentication information. The behavior of the passenger is tracked and managed by position information of the network camera installation place and timestamp of the captured image.

CITATION LIST

Patent Literature

[PTL 1] WO 2005/055151

SUMMARY OF INVENTION

Technical Problem

As described above, a face authentication system has been started to be applied to various procedures in the airport. Here, not all of airport users use the face authentication system, and a certain percentage of the users do not use the face authentication system at present. Therefore, all of terminals installed in the various procedures cannot support the face authentication.

Therefore, it is conceivable that the terminal set in each area where the procedure is performed supports both the procedure using a face authentication function and the procedure not using the face authentication. That is, it is conceivable to install a hybrid terminal having both the face authentication function and a conventional procedure function. In this case, if the user of the face authentication system passes in front of the terminal (hybrid terminal), the procedure ends, but the non-user of the face authentication system performs identify authentication using a passport or the like on the same terminal.

By such a measure (introduction of the hybrid terminal having the two functions), it is possible to cope with a mixture of the system user and the non-user, but there is also an aspect that the system user and the non-user line up in the same terminal, and the convenience of the face authentication system is impaired.

A main object of the present disclosure is to provide an authentication system, a method, and a program that contribute to improving convenience of a user.

Solution to Problem

According to the first aspect of the present disclosure, there is provided an authentication system including: at least one or more first terminals capable of providing a service by a biometric authentication function or a non-biometric authentication function; a plurality of second terminals each capable of switching a biometric authentication function and a non-biometric authentication function and capable of providing a service by the biometric authentication function or the non-biometric authentication function; and a server device connected to the at least one or more first terminals and the plurality of second terminals, in which the server device calculates a use rate of the biometric authentication function in the at least one or more first terminals, and determines an operation mode of at least one or more second terminals among the plurality of second terminals in accordance with the calculated use rate.

According to the second aspect of the present disclosure, there is provided a method including: in an authentication system including at least one or more first terminals capable of providing a service by a biometric authentication function or a non-biometric authentication function, a plurality of second terminals each capable of switching a biometric authentication function and a non-biometric authentication function and capable of providing a service by the biometric authentication function or the non-biometric authentication function, and a server device connected to the at least one or more first terminals and the plurality of second terminals, calculating a use rate of the biometric authentication function in the at least one or more first terminals; and determining an operation mode of at least one or more second terminals among the plurality of second terminals in accordance with the calculated use rate.

According to the third aspect of the present disclosure, there is provided a computer-readable recording medium recording a program for causing a computer mounted on a server device connected to at least one or more first terminals and a plurality of second terminals to execute: the at least one or more first terminals capable of providing a service by a biometric authentication function or a non-biometric authentication function, and the plurality of second terminals each capable of switching a biometric authentication function and a non-biometric authentication function and capable of providing a service by the biometric authentication function or the non-biometric authentication function, processing of calculating a use rate of the biometric authentication function in the at least one or more first terminals; and processing of determining an operation mode of at least one or more second terminals among the plurality of second terminals in accordance with the calculated use rate.

Advantageous Effects of Invention

According to each aspect of the present disclosure, an authentication system, a method, and a program that contribute to improving convenience of a user are provided. The effect of the present disclosure is not limited to the above. According to the present disclosure, other effects may be exhibited instead of or in addition to the effect.

BRIEF DESCRIPTION OF DRAWINGS

FIG. 6 is a diagram for describing an operation of an operation mode determination unit.

EXAMPLE EMBODIMENT

Figure 1:
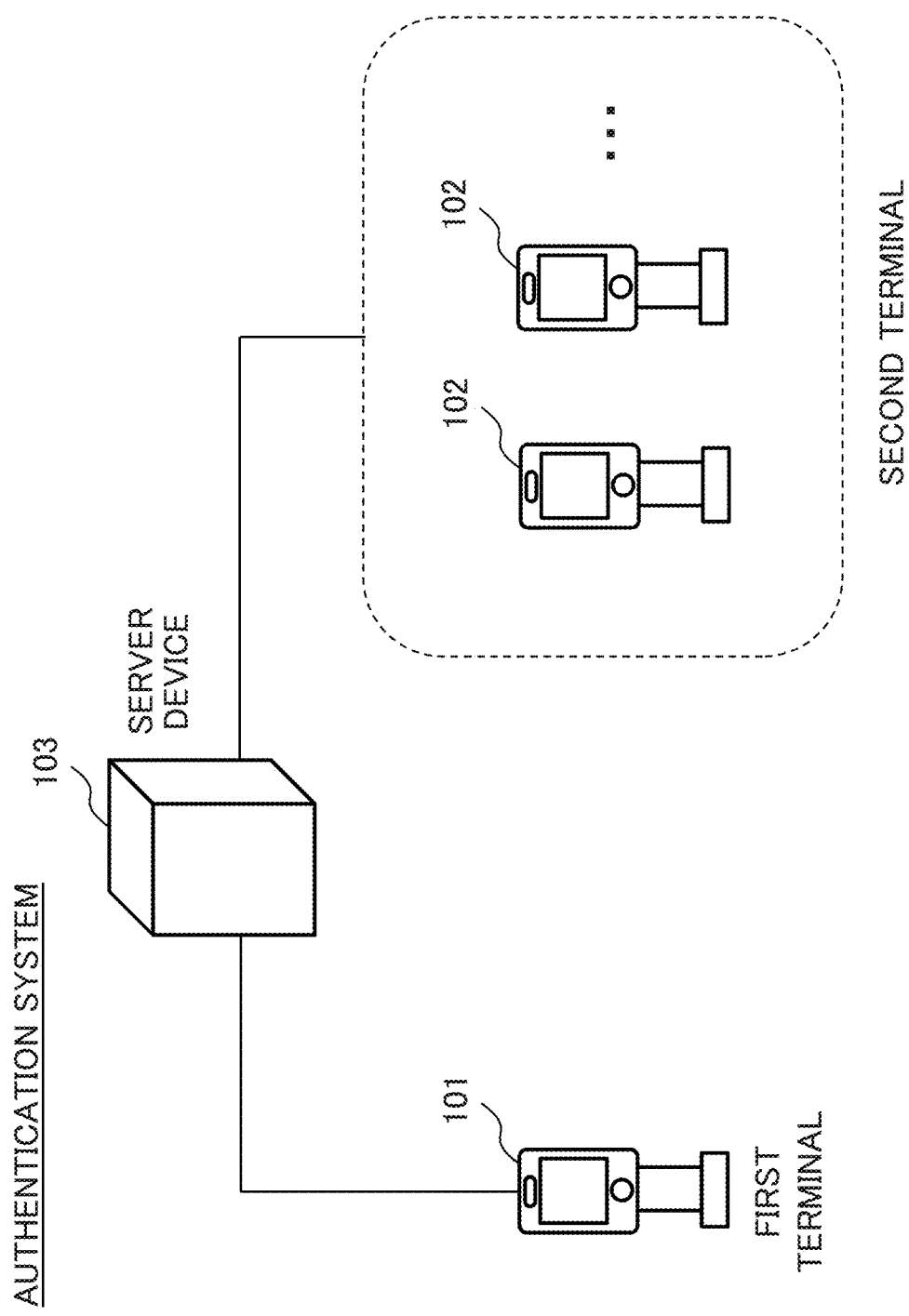
FIG. 1 is a diagram for describing an outline of an example embodiment.

First, an outline of an example embodiment will be described. Note that the reference numerals in the drawings attached to this outline are attached to elements for convenience as an example for assisting understanding, and description of this outline is not intended to be any limitation. In addition, in a case where there is no particular explanation, a block illustrated in each drawing represents not a configuration of a hardware unit but a configuration of a functional unit. A connection line between blocks in each drawing includes both bidirectional and unidirectional lines. A unidirectional arrow schematically indicates a flow of a main signal (data) and does not exclude bidirectionality. In the present specification and the drawings, elements that can be similarly described are denoted by the same reference numerals, and redundant description can be omitted.

An authentication system according to an example embodiment includes at least one or more first terminals 101, a plurality of second terminals 102, and a server device 103 (see FIG. 1). The first terminal 101 is a terminal capable of providing a service using a biometric authentication function or a non-biometric authentication function. Each of the second terminals 102 is a terminal capable of switching the biometric authentication function and the non-biometric authentication function and capable of providing a service using the biometric authentication function or the non-biometric authentication function. The server device 103 is a server connected to the first terminal 101 and the plurality of second terminals 102. The server device 103 calculates a use rate of the biometric authentication function in the at least one or more first terminals 101. The server device 103 determines an operation mode for at least one or more of the plurality of second terminals 102 based on the calculated use rate.

In the-described authentication system, the server device 103 grasps a use situation of the biometric authentication in the first terminal 101. The server device 103 determines the operation mode of the second terminal 102 according to the grasped use situation of the biometric authentication. Specifically, server device 103 increases the number of second terminals 102 that provides the service by biometric authentication setting in a situation where the biometric authentication is frequently used. On the other hand, the server device 103 reduces the number of second terminals 102 that provides the service by biometric authentication setting if the use situation of biometric authentication is infrequent. With such a response, the operation mode of the second terminal 102, which is a subsequent-stage terminal, is optimized, and the throughput of the system increases. As a result, the convenience of the system is improved.

Hereinafter, specific example embodiments will be described in more detail with reference to the drawings.

First Example Embodiment

A first example embodiment will be described in more detail with reference to the drawings.

[Configuration of System]

Figure 2:
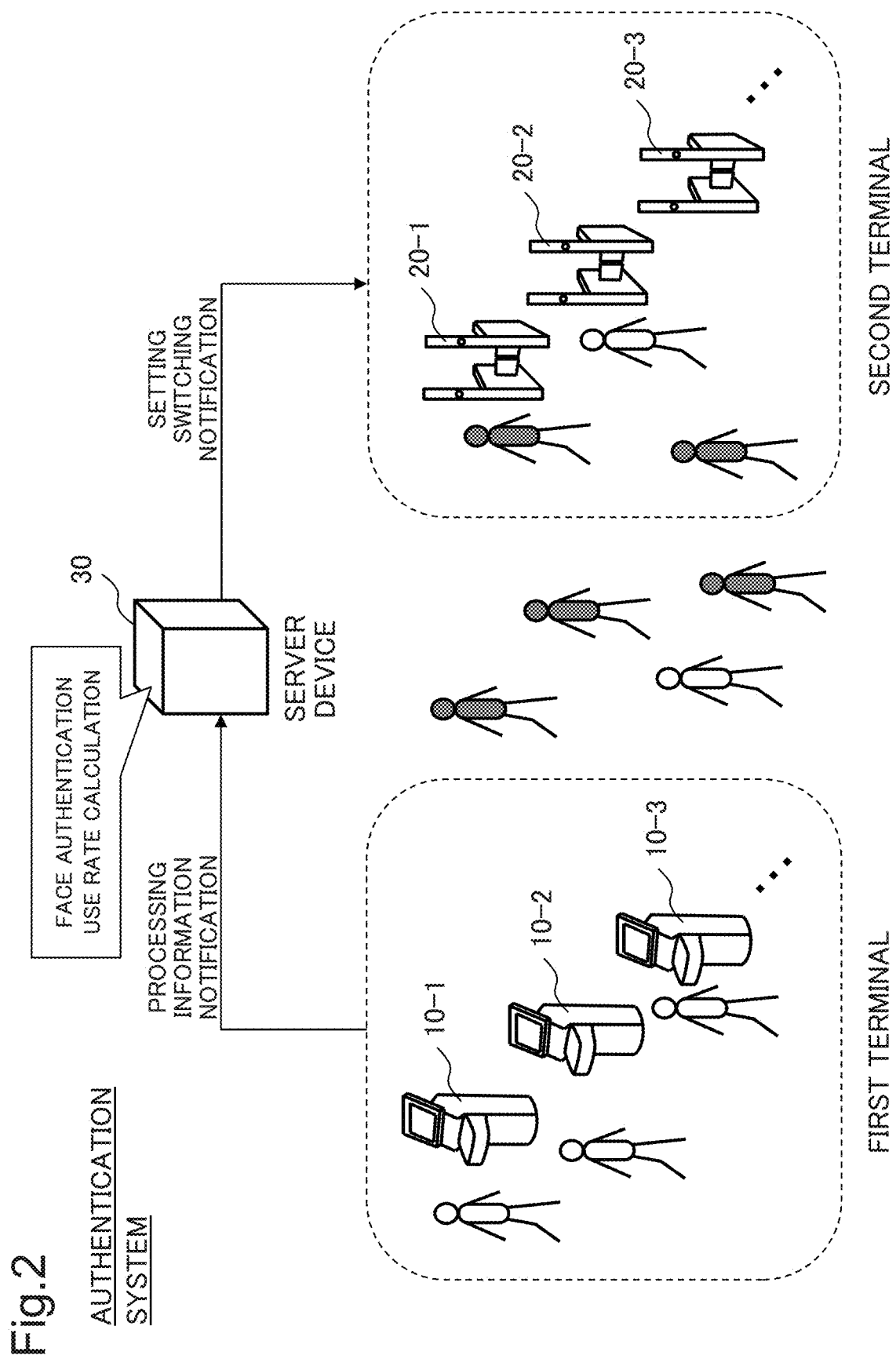
FIG. 2 is a diagram illustrating an example of a schematic configuration of an authentication system according to a first example embodiment.

FIG. 2 is a diagram illustrating an example of a schematic configuration of an authentication system according to the first example embodiment. Referring to FIG. 2, the authentication system includes a plurality of first terminals 10-1 to 10-3, a plurality of second terminals 20-1 to 20-3, and a server device 30. The configuration illustrated in FIG. 2 is an example and is not intended to limit the number of terminals and the like.

In the following description, when there is no particular reason to distinguish the first terminals 10-1 to 10-3, they are simply referred to as "first terminals 10". Similarly, other elements are represented by reference numerals before hyphens.

The first terminals 10 and the server device 30 are configured to be communicable by wired or wireless communication means. The second terminals 20 and the server device 30 are similarly configured to be communicable.

Each of the first terminals 10 is configured to perform a predetermined procedure. For example, the first terminal 10 is configured to perform a check-in procedure.

Each of the second terminals 20 is configured to perform a procedure subsequent to the procedure performed in the first terminal. That is, the second terminal 20 is installed at a subsequent stage of the first terminal 10, and is configured to perform a procedure different from that of the first terminal 10. For example, the second terminal 20 is configured to perform processing related to a security check of the user who has completed the check-in procedure.

The first terminal 10 and the second terminal 20 are configured to be able to switch their operation modes. Specifically, the first terminal 10 and the second terminal 20 are configured to be switchable between a setting for performing a procedure by face authentication (hereinafter referred to as a face authentication setting) and a setting for performing a conventional procedure without using the face authentication (hereinafter referred to as a non-face authentication setting). That is, the first terminal 10 and the second terminal 20 can switch the face authentication function and the non-face authentication function (conventional function), and provide the service to the user using one of the functions.

For example, the first terminal 10 is assumed to be a terminal that performs the check-in procedure. In this case, the first terminal 10 in the face authentication setting acquires biometric information (face image) of the user in front, and generates a feature amount (a feature vector including a plurality of feature amounts) from the acquired biometric information. Thereafter, the first terminal 10 acquires related biometric information (face image) from an integrated circuit (IC) chip of a passport presented by the user, and generates the feature amount from the face image. The first terminal 10 collates the two feature amounts (one-to-one collation). When the collation is successful, the first terminal 10 transmits the biometric information (or the feature amount) of the user, an identifier (ID) for uniquely identifying the user, and the like to a management server (not illustrated). The management server provides the user with the face authentication service using the received information.

Meanwhile, the first terminal 10 with the non-face authentication setting operates as a terminal operated by airline staff. That is, the first terminal 10 with the non-face authentication setting operates as a terminal that issues a boarding pass when a staff member checks the passport and determines that the user in front has the correct passport.

For example, the second terminal 20 is assumed to be a terminal that performs processing related to the security check. In this case, the second terminal 20 with the face authentication setting acquires the face image of the user whose security check has been completed by a gate o metal detection or the like, and generates a feature amount from the acquired face image. The second terminal 20 transmits the generated feature amount to the management server. The management server performs collation (one-to-N matching; N is a positive integer and the same applies to below) using the acquired feature amount and the feature amount stored in a database (the database that stores the information transmitted from the first terminal 10). The management server transmits a collation result (the ID of the user specified by the collation) to the second terminal 20. The second terminal 20 manages the user who has passed the security check by the transmitted ID.

Meanwhile, the second terminal 20 with the non-face authentication setting operates as a terminal operated by the staff member in charge. The second terminal 20 with the non-face authentication setting operates as a terminal to which the staff member in charge inputs information and the like of the user who has passed the security check.

The function of the management server may be implemented in the server device 30 or may be implemented in a device different from the server device 30. Since an existing technique can be used for the collation (one-to-one matching or one-to-N matching) performed by the management server, detailed description thereof will be omitted. For example, the management server calculates a Euclidean distance or the like between the biometric information of a collation target (the feature vector of a target to be collated) and the biometric information on a registration side (the feature vector) as similarity, and performs the above collation by threshold processing or the like for the similarity.

The server device 30 is a device that switches the operation mode of the subsequent-stage terminal (second terminal 20) in such a way as to maximize the throughput of the authentication system, that is, the number of times of processing per unit time.

[Schematic Operation of System]

Next, a schematic operation of the authentication system according to the first example embodiment will be described with reference to FIG. 2.

Each of the first terminals 10 notifies the server device 30 of "processing information" including the number of users processed by the first terminal 10. More specifically, the first terminal 10 operating with the face authentication setting notifies the server device 30 of the number of users (the number of times of face authentication processing) for which the service by the setting has been provided in unit time (for example, 10 minutes or 1 hour). More specifically, the first terminal 10 operating with the non-face authentication setting notifies the server device 30 of the number of users (the number of times of non-face authentication processing) for which the service by the setting has been provided in unit time.

The server device 30 calculates a face authentication use rate per unit time based on the processing information notified from a first terminal group (the first terminal 10 with the face authentication setting and the first terminal 10 with the non-face authentication setting). Specifically, the server device 30 calculates the face authentication use rate by the following Equation (1).

[Math. 1]

$$\text{FACE AUTHENTICATION USE RATE} = \text{TOTAL NUMBER OF TIMES OF FACE AUTHENTICATION PROCESSING}/(\text{TOTAL NUMBER OF TIMES OF FACE AUTHENTICATION PROCESSING} + \text{TOTAL NUMBER OF TIMES OF NON-FACE AUTHENTICATION PROCESSING}) \quad (1)$$

In Equation (1), the total number of face authentication processing is the total number of users (the number of times of face authentication processing) processed per unit time by the first terminal 10 that provides the service by the face authentication function among the plurality of first terminals 10. Similarly, the total number of non-face authentication processing is the total number of users (the number of times of non-face authentication processing) processed per unit time by the first terminal 10 that provides the service by the non-face authentication function among the plurality of first terminals 10. That is, the server device 30 aggregates the processing information acquired from each of the plurality of first terminals 10 and calculates the face authentication use rate.

The server device 30 determines and switches the operation mode (the face authentication setting or the non-face authentication setting) of each terminal included in a second terminal group (the second terminal 20 with the face authentication setting and the second terminal 20 with the non-face authentication setting) based on the calculated face authentication use rate.

Specifically, the server device 30 increases the number of second terminals 20 operating with the face authentication setting when the face authentication use rate is high. Alternatively, the server device 30 reduces the number of second terminals 20 operating with the face authentication setting when the face authentication use rate is low.

For example, in FIG. 2, the user who has completed the procedure in the first terminal 10 by the face authentication is illustrated in gray. The server device 30 assumes that the use of the face authentication will be frequent in the second terminal group following the first terminal group and increases the number of second terminals 20 with the face authentication setting when the number of users who have used the face authentication among the users who have passed through the first terminal 10 is large. In this case, in an extreme example, when the face authentication use rate is 100%, there is no need to install terminals supporting the conventional procedure in the second terminal group, and the server device 30 can set all terminals in the second terminal group to the face authentication setting.

In contrast, the server device 30 assumes that the use of the face authentication will be less frequent in the second terminal group following the first terminal group and reduces the number of second terminals 20 with the face authentication setting when the number of users who have used the face authentication among the users who have passed through the first terminal group is small. In this case, in an extreme example, when the face authentication use rate is 0%, there is no need to install terminals supporting the face authentication procedure in the second terminal group, and the server device 30 can set all the terminals in the second terminal group to the non-face authentication setting.

It is desirable to install a bulletin board (digital signage or the like) that guides a terminal number and the like available to each user (face authentication system user or face authentication system non-user) near the second terminal group in consideration of convenience of the user. Alternatively, the face authentication function may be mounted on the digital signage to improve user convenience. For example, in a case where the user in front is found to be a user of the face authentication system (a user with an ID registered in the management server), the digital signage may display (instruct) the second terminal 20 to which the user is to go. In this case, the server device 30 notifies the digital signage of the operation mode of the second terminal 20.

Next, details of each device included in the authentication system will be described.

[First Terminal]

Figure 3:
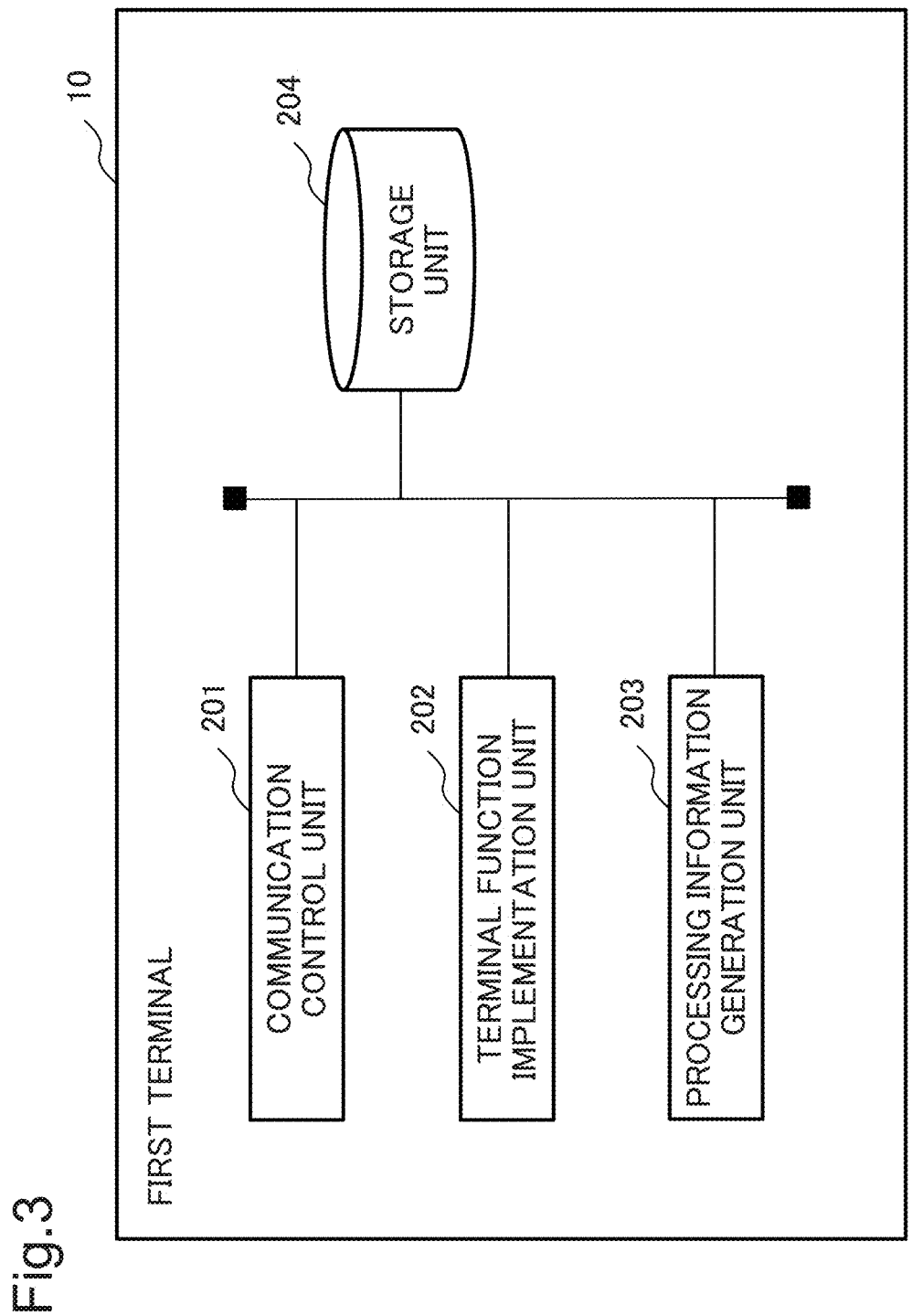
FIG. 3 is a diagram illustrating an example of a processing configuration of a first terminal according to the first example embodiment.

FIG. 3 is a diagram illustrating an example of a processing configuration of the first terminal 10 according to the first example embodiment. Referring to FIG. 3, the first terminal 10 includes a communication control unit 201, a terminal function implementation unit 202, a processing information generation unit 203, and a storage unit 204.

The communication control unit 201 is a means that controls communication with other devices. Specifically, the communication control unit 201 receives data (packet) from the server device 30. Further, the communication control unit 201 transmits data to the server device 30.

The terminal function implementation unit 202 is a means that implements a function allocated to the first terminal 10. Specifically, in a case where the first terminal 10 operates as a check-in terminal, the terminal function implementation unit 202 executes processing related to the check in.

In the case of operating with the face authentication setting, the terminal function implementation unit 202 executes processing related to the face authentication. Specifically, the terminal function implementation unit 202 acquires a face image of the user in front and calculates the feature amount. Furthermore, in the case of operating with non-face authentication setting, the terminal function implementation unit 202 receives information input by the staff member in charge and processes the received information.

Since the terminal function implementation unit 202 changes according to the function allocated to the first terminal 10, more detailed description regarding implementation of the function will be omitted.

The terminal function implementation unit 202 notifies the processing information generation unit 203 of the processing content each time the terminal function implementation unit processes the user's procedure. For example, when the check-in procedure of the user is completed, the terminal function implementation unit 202 notifies the processing information generation unit 203 of the completion of the procedure together with the operation mode (face authentication setting or non-face authentication setting) at that time.

The processing information generation unit 203 is a means that generates "processing information" to be notified to the server device 30. The processing information generation unit 203 counts the number of user procedures processed by the terminal function implementation unit 202 every predetermined period. The processing information generation unit 203 transmits the "processing information" including the number of users counted each time the predetermined period passes to the server device 30. More specifically, the processing information generation unit 203 transmits "processing information" including the setting mode (face authentication setting and non-face authentication setting) of the terminal and the number of times of processing of the user to the server device 30.

The storage unit 204 is a means that stores information necessary for the operation of the first terminal 10.

[Second Terminal]

The plurality of second terminals 20 is terminals installed at a subsequent stage of the at least one or more first terminals 10. That is, the second terminal 20 is a terminal that provides a service for the user who has completed the procedure (service) by the first terminal 10.

Figure 4:
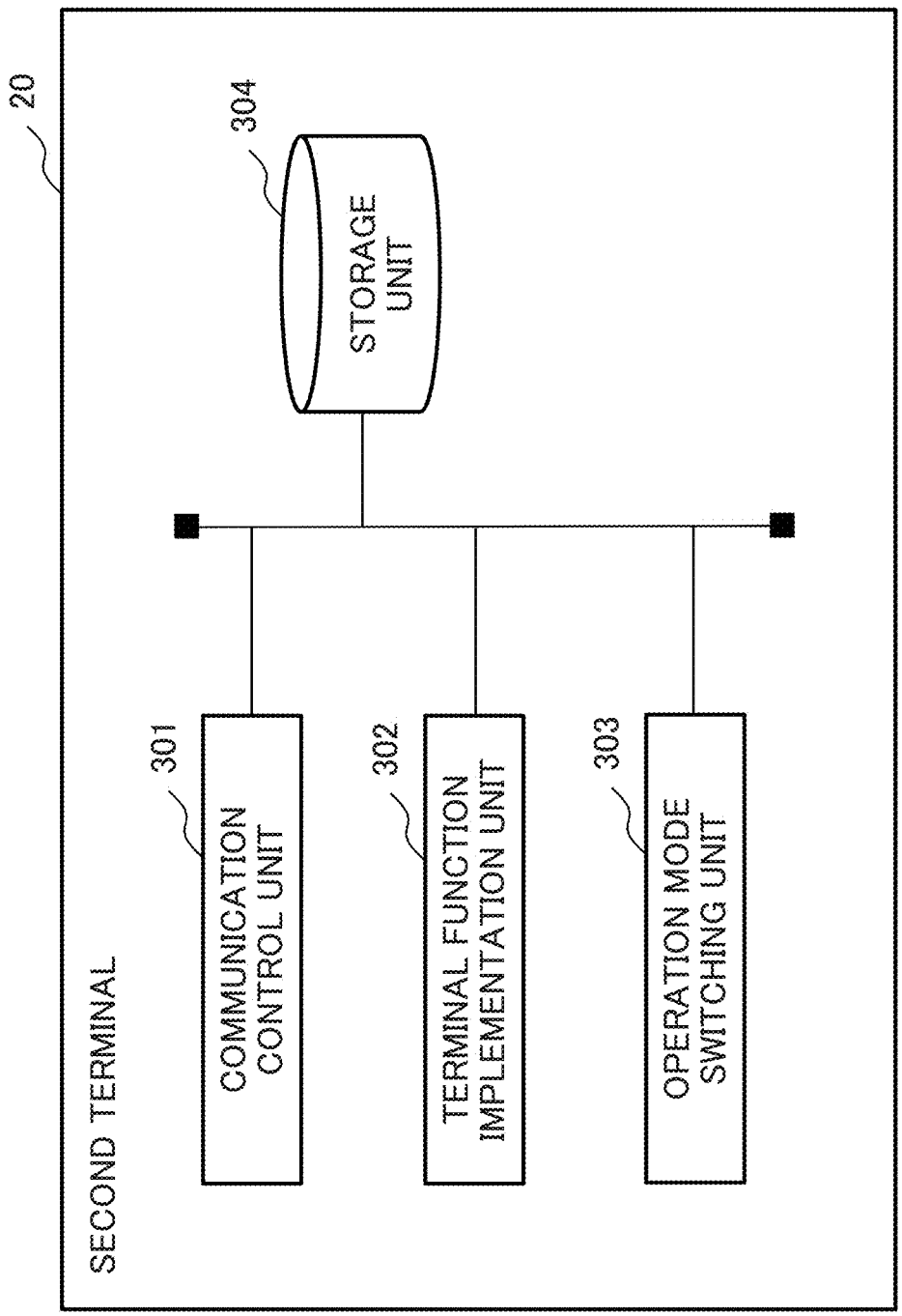
FIG. 4 is a diagram illustrating an example of a processing configuration of a second terminal according to the first example embodiment.

FIG. 4 is a diagram illustrating an example of a processing configuration of the second terminal 20 according to the first example embodiment. Referring to FIG. 4, the second terminal 20 includes a communication control unit 301, a terminal function implementation unit 302, an operation mode switching unit 303, and a storage unit 304.

The communication control unit 301 is a means that controls communication with other devices. Specifically, the communication control unit 301 receives data (packet) from the server device 30. Further, the communication control unit 301 transmits data to the server device 30.

The terminal function implementation unit 302 is a means that implements a function allocated to the second terminal 20. Specifically, in a case where the second terminal 20 operates as a terminal related to a security check, the terminal function implementation unit 302 executes processing related to the security check. Note that since the terminal function implementation unit 302 changes according to the function allocated to the second terminal 20, more detailed description regarding implementation of the function will be omitted, similarly to the terminal function implementation unit 202 of the first terminal 10.

The operation mode switching unit 303 is a means that switches the operation mode of the terminal function implementation unit 302 according to a "setting switching notification" received from the server device 30. In the case where "face authentication setting" is notified from the server device 30, the operation mode switching unit 303 instructs the terminal function implementation unit 302 to operate with the "face authentication setting". Similarly, in the case where the "non-face authentication setting" is notified from the server device 30, the operation mode switching unit 303 instructs the terminal function implementation unit 302 to operate with the "non-face authentication setting".

The storage unit 304 is a means that stores information necessary for the operation of the second terminal 20.

Note that the operation mode of the first terminal 10 can be set by any method. For example, an administrator or the like may input the operation mode by changing a setting menu of the first terminal 10. Alternatively, the server device 30 may notify the first terminal 10 of the operation mode.

[Server Device]

Figure 5:
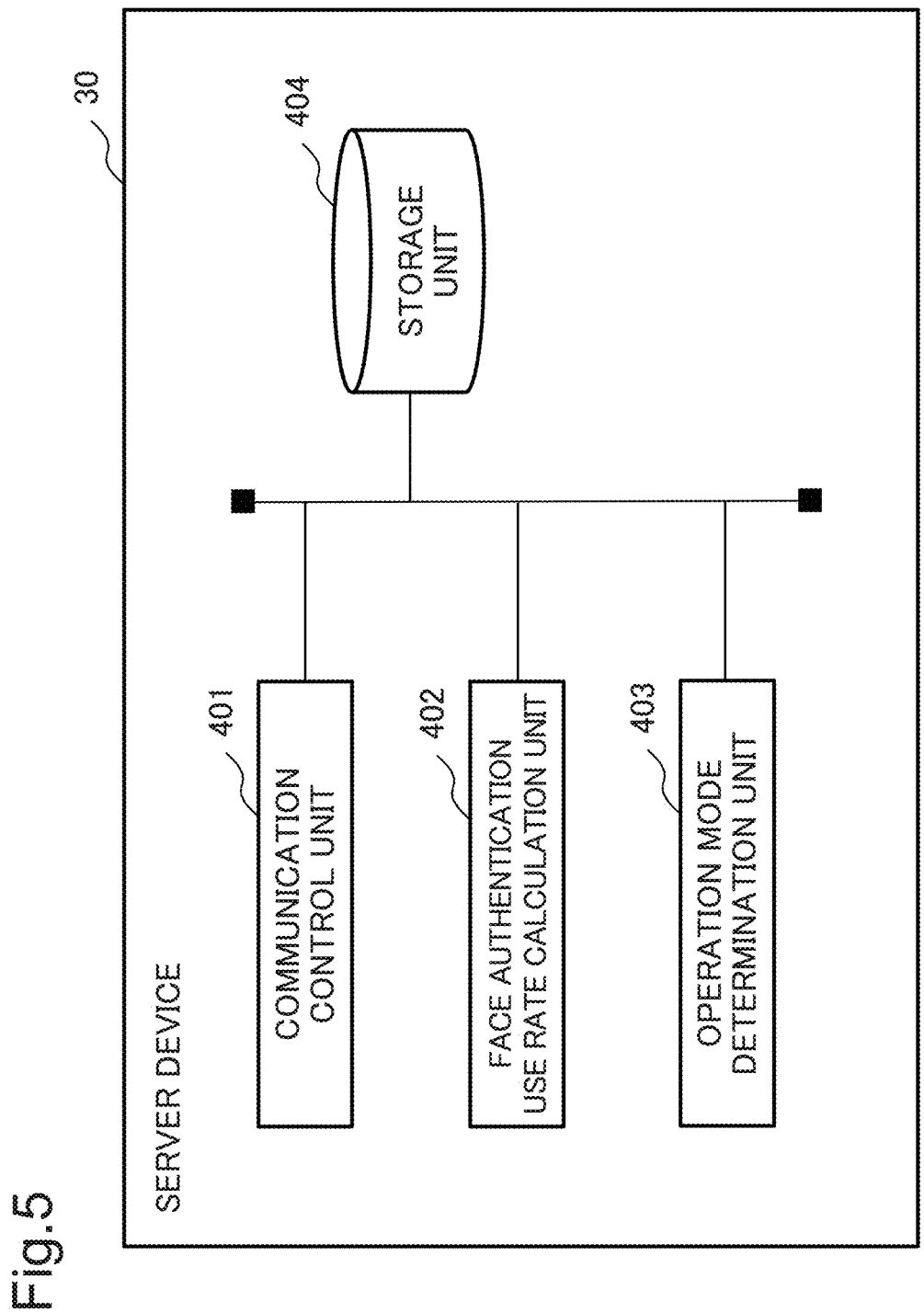
FIG. 5 is a diagram illustrating an example of a processing configuration of a server device according to the first example embodiment.

FIG. 5 is a diagram illustrating an example of a processing configuration of the server device 30 according to the first example embodiment. Referring to FIG. 5, the server device 30 includes a communication control unit 401, a face authentication use rate calculation unit 402, an operation mode determination unit 403, and a storage unit 404.

The communication control unit 401 is a means that controls communication with other devices. Specifically, the communication control unit 401 receives data (packets) from first terminal 10 and the second terminal 20. Furthermore, the communication control unit 401 transmits data to the first terminal 10 and the second terminal 20.

The face authentication use rate calculation unit 402 is a means that calculates the face authentication use rate. The face authentication use rate calculation unit 402 counts the processing information transmitted from each of the plurality of first terminals 10, and calculates the face authentication use rate per unit time. Specifically, the face authentication use rate calculation unit 402 classifies the number of times of processing of each terminal into either "the number of times of face authentication processing" or "the number of times of non-face authentication processing" based on the operation mode of the processing information transmitted from the first terminal 10.

Thereafter, the face authentication use rate calculation unit 402 adds the number of times of processing of each terminal for each operation mode, calculates the total number of times of face authentication processing and the total number of times of non-face authentication processing, and calculates the face authentication use rate by applying these calculated total numbers to the above-described Equation (1). The face authentication use rate calculation unit 402 passes the calculated face authentication use rate to the operation mode determination unit 403.

The operation mode determination unit 403 is a means that determines the operation mode of the second terminal 20 based on the calculated face authentication use rate. Specifically, the operation mode determination unit 403 determines the operation mode of at least one or more of the plurality of second terminals 20. For example, the operation mode determination unit 403 determines the operation mode of the second terminal 20 in such a way that the number of second terminals 20 operating with the face authentication setting becomes large when the face authentication use rate is high. In contrast, the operation mode determination unit 403 determines the operation mode of the second terminal 20 in such a way that the number of second terminals 20 operating with the non-face authentication setting becomes large when the face authentication use rate is low.

For example, the operation mode determination unit 403 determines the operation mode of the second terminal 20 with reference to table information in which the face authentication use rate is associated with the number of second terminals 20 to operate with the face authentication setting. For example, the operation mode determination unit 403 refers to the table information as illustrated in FIG. 6, and determines the number of second terminals 20 to operate with the face authentication setting according to the face authentication use rate. In the example of FIG. 6, when the face authentication use rate is equal to or more than 90%, the number of second terminals 20 operating with the face authentication setting is set to A1. In the example of FIG. 6, A1>A2>A3 is satisfied.

When determining the number of second terminals 20 to operate with the face authentication setting in accordance with the face authentication use rate, the operation mode determination unit 403 determines the second terminals 20 for which the operation mode is to be changed. Specifically, in a case of increasing the number of second terminals 20 operating with the face authentication setting, the operation mode determination unit 403 selects the number of increase (change) of the second terminals 20 operating with the non-face authentication setting. The operation mode determination unit 403 instructs the selected second terminals 20 to change the operation mode. In the above example, the operation mode determination unit 403 transmits the setting switching notification to the selected second terminals 20 to operate with the face authentication setting.

In this manner, the face authentication use rate calculation unit 402 calculates the use rate of the face authentication function in at least one or more first terminals 10. Further, the operation mode determination unit 403 determines the number of terminals that provides the service with the face authentication function among the plurality of second terminals 20 based on the calculated use rate. More specifically, the operation mode determination unit 403 selects terminals that require switching between the face authentication function and the non-face authentication function among the plurality of second terminals 20 based on the face authentication use rate, and transmits the setting switching notification to the selected second terminals 20.

[Operation of System]

Figure 7:
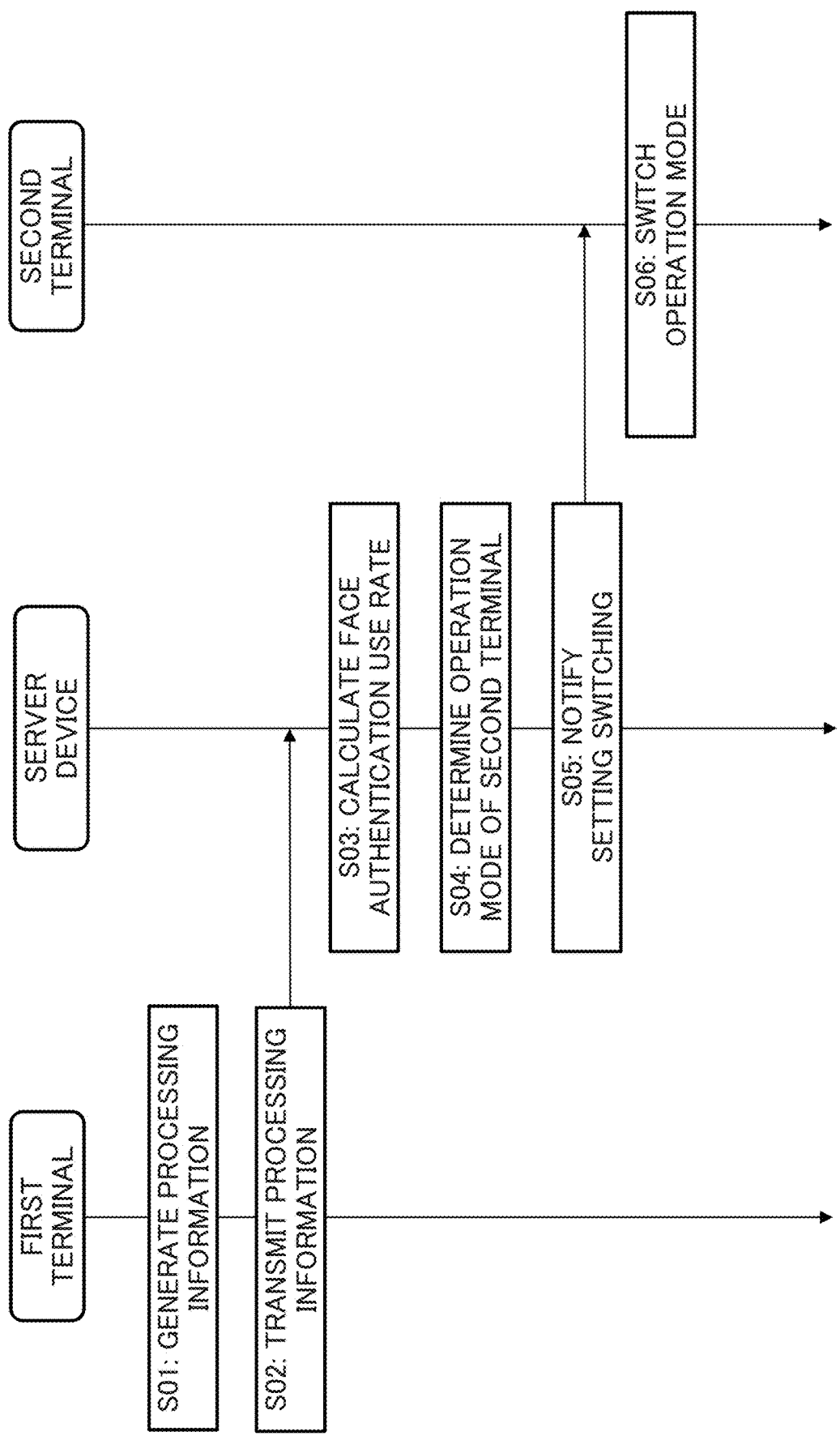
FIG. 7 is a sequence diagram illustrating an example of an operation of the authentication system according to the first example embodiment.

Next, an operation of the authentication system according to the first example embodiment will be described. FIG. 7 is a sequence diagram illustrating an example of an operation of the authentication system according to the first example embodiment.

The first terminal 10 generates the processing information including the number of processed users per unit time (the number of users processed by the face authentication and the number of users processed by the conventional processing) (step S01).

The first terminal 10 transmits the generated processing information to the server device 30 (step S02).

In this manner, each of the plurality of first terminals 10 generates the processing information including the number of users for which the service by the face authentication function has been provided per unit time or the number of users for which the service by the non-face authentication function has been provided per unit time. In addition, each of the plurality of first terminals 10 transmits the processing information to the server device 30.

The server device 30 counts the processing information acquired from the first terminals 10, and calculates the total number of face authentication users (the total number of times of face authentication processing) and the total number of times of non-face authentication users (the total number of times of non-face authentication processing) processed per unit time. The server device 30 calculates the face authentication use rate using these total numbers (step S03).

The server device 30 determines the operation mode of the second terminal 20 based on the face authentication use rate (step S04). Specifically, the server device 30 increases the number of second terminals 20 operating with the face authentication setting when the face authentication use rate is high.

The server device 30 transmits the setting switching notification to the second terminal 20 of which the operation mode is to be switched (step S05).

When receiving the setting switching notification, the second terminal 20 switches the setting (the face authentication setting or the conventional processing setting) of the second terminal according to the notification (step S06).

As described above, in the authentication system according to the first example embodiment, the server device 30 grasps the use situation of the face authentication in the first terminal 10. The server device 30 determines the operation mode of the second terminal 20 belonging to the second terminal group (the plurality of second terminals 20) according to the grasped use situation of the face authentication. Specifically, the server device 30 increases the number of second terminals 20 that provides the service with the face authentication setting in the situation where the face authentication is frequently used. In contrast, the server device 30 reduces the number of second terminals 20 that provides the service with the face authentication setting when the use situation of the face authentication is infrequent. That is, the server device 30 dynamically switches the operation mode (enables the biometric authentication or disables the biometric authentication) in the subsequent-stage terminal (second terminal 20) located downstream of the system according to the use situation of the face authentication (biometric authentication) in the preceding-stage terminal (first terminal 10) located upstream of the system. Even if the ratios of attributes (the face authentication user and the face authentication non-user) of the system users substantially change according to a time zone, a season, or the like, the operation mode of the subsequent-stage terminal is optimized by the switching and the throughput of the system can be increased. As a result of the increase in the throughput of the system, the convenience of the authentication system is improved.

Second Example Embodiment

Next, a second example embodiment will be described in detail with reference to the drawings.

In the first example embodiment, it has been described that the operation mode of the second terminal 20 is determined based on the "processing information" notified from the first terminal 10. In the second example embodiment, it will be described that an operation mode of a second terminal 20 is determined based on information obtained from a camera device installed in a field.

Figure 8:
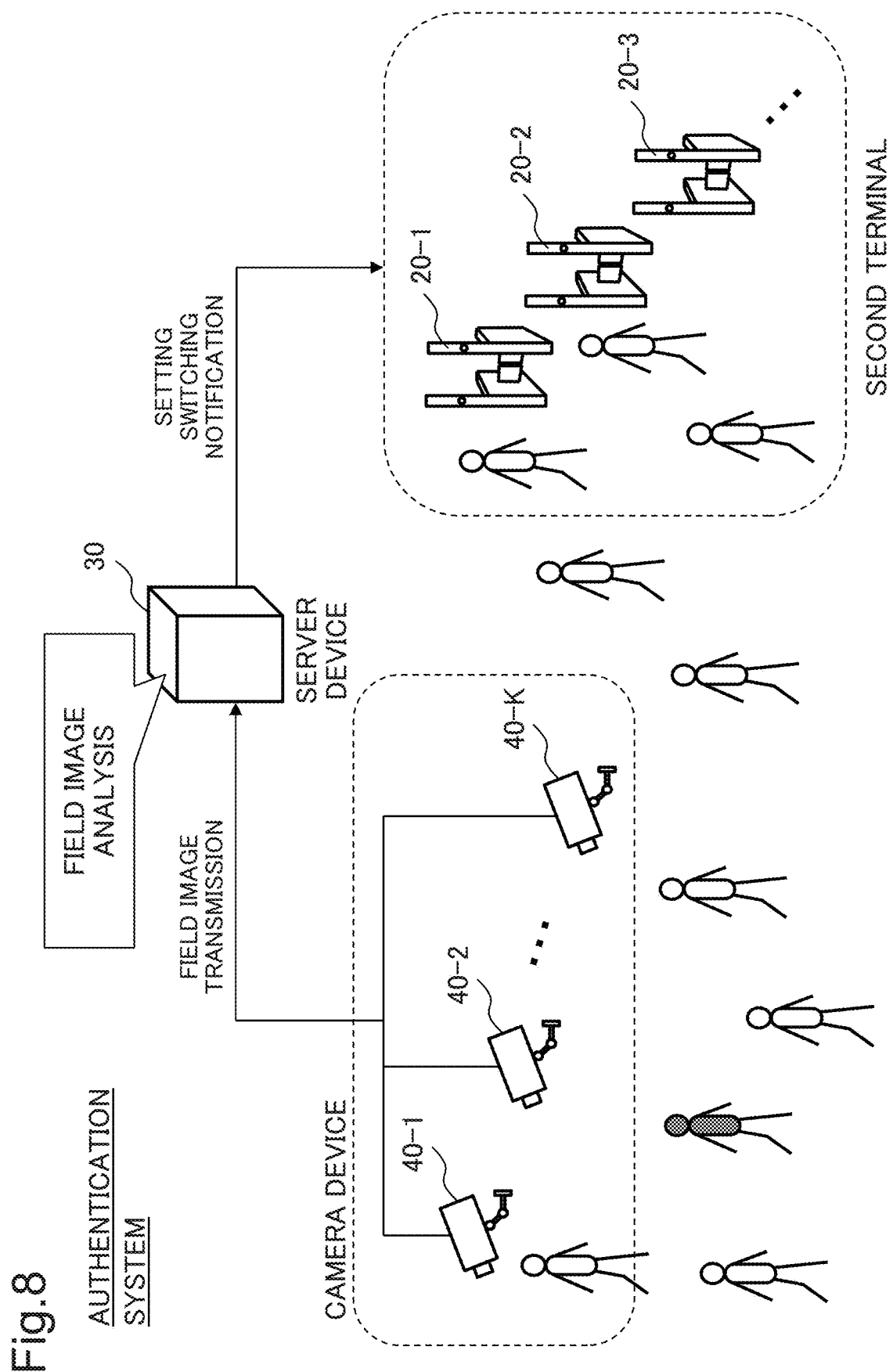
FIG. 8 is a diagram illustrating an example of a schematic configuration of an authentication system according to a second example embodiment.

FIG. 8 is a diagram illustrating an example of a schematic configuration of an authentication system according to the second example embodiment. Referring to FIG. 8, the authentication system includes camera devices 40-1 to 40-K (K is a positive integer and the same applies to below), a second terminal 20, and a server device 30.

The camera devices 40 are installed at various places in the field (for example, in an airport). The camera devices 40 are configured to be communicable with the server device 30 by wired or wireless communication means.

Each of the camera devices 40 transmits an image obtained by imaging an inside of the field to the server device 30. The server device 30 analyzes the acquired field image, and switches the operation mode of the second terminal 20 based on a result of the analysis.

For example, in a case of finding a suspicious person (a person illustrated in gray in FIG. 8) in the field, the server device 30 switches the operation mode of the second terminal 20 to non-face authentication setting. In the case of finding a suspicious person, the server device 30 switches the operation mode to the non-face authentication setting that requires an operation of a staff member or the like instead of the second terminal 20 automatically operating (operating in an unmanned manner). By such switching, the security in the field (in the airport) is reinforced. That is, the server device 30 reinforces a monitoring system in the field by increasing the number of second terminals 20 operating with the non-face authentication setting (alternatively, setting all the second terminals 20 to the non-face authentication setting).

Alternatively, the server device 30 may switch the operation mode of the second terminal 20 to the non-face authentication setting in a case of finding a person who needs support of the staff member, such as a physically handicapped person or a pregnant female, by analyzing the field image. That is, in a case of finding a physically handicapped person or the like, the server device 30 may increase the number of the second terminals 20 operating with the non-face authentication setting.

Alternatively, the server device 30 may calculate a congestion status of each procedure area (for example, in the case of an airport, a security inspection area or a boarding area) by analyzing the field image, and switch the operation mode of the second terminal 20 based on the calculated congestion status.

Next, details of the server device 30 included in the authentication system according to the second example embodiment will be described. Note that a general-purpose web camera or the like can be used as the camera device 40. Further, the second terminal 20 can have the same configuration and function as those described in the first example embodiment. Therefore, detailed description of these devices is omitted.

[Server Device]

Figure 9:
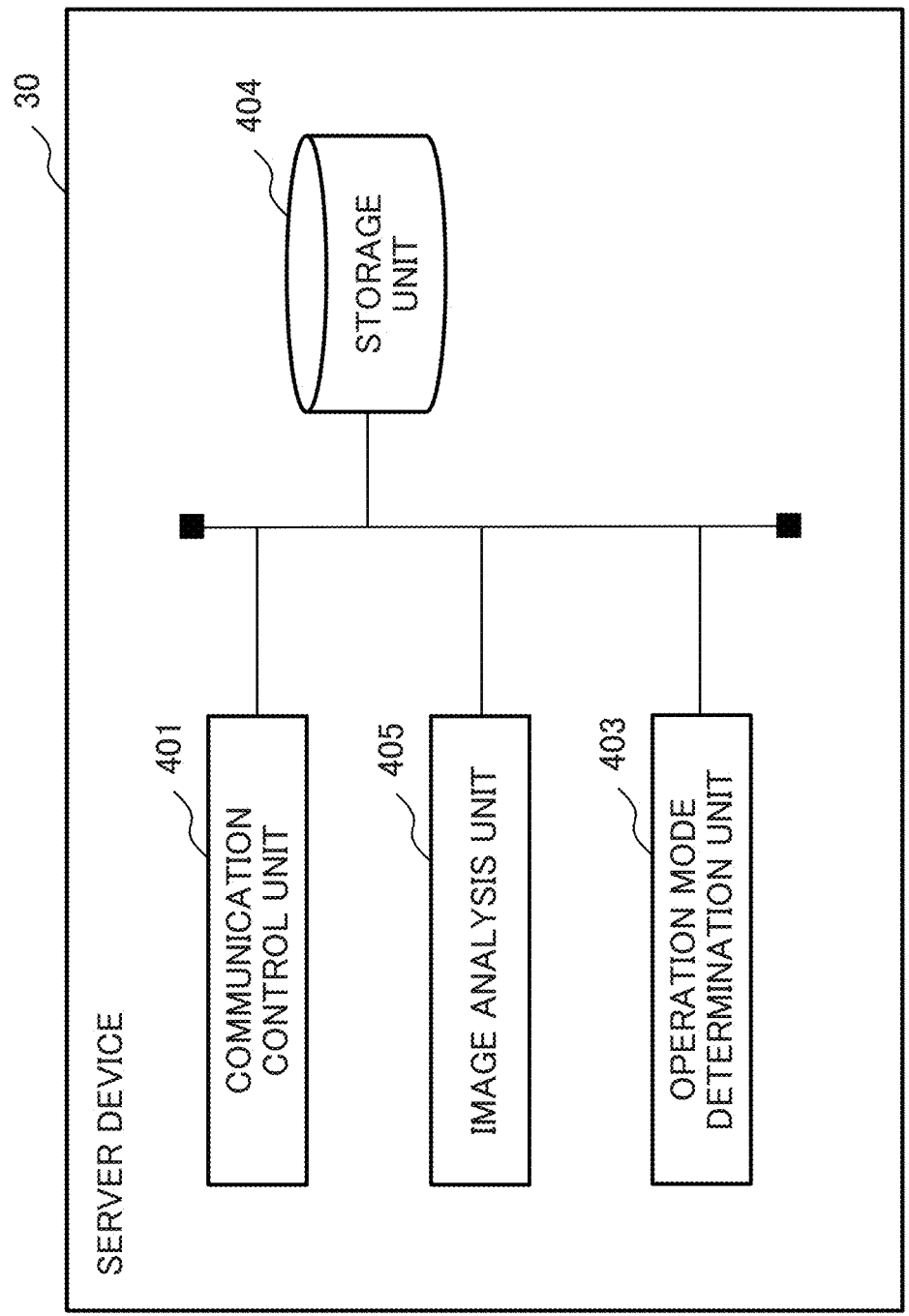
FIG. 9 is a diagram illustrating an example of a processing configuration of a server device according to the second example embodiment.

FIG. 9 is a diagram illustrating an example of a processing configuration (processing module) of the server device 30 according to the second example embodiment. Referring to FIG. 9, the server device 30 includes a communication control unit 401, an operation mode determination unit 403, a storage unit 404, and an image analysis unit 405.

Comparing FIGS. 5 and 9, in the second example embodiment, the image analysis unit 405 is added instead of the face authentication use rate calculation unit 402.

The image analysis unit 405 is a means that analyzes the field image acquired from the camera device 40 and notifies the operation mode determination unit 403 of the result.

For example, the image analysis unit 405 executes analysis regarding whether a suspicious person is present in the field. In this case, the image analysis unit 405 extracts a person from the acquired field image and extracts a face area of the extracted person. The image analysis unit 405 calculates a feature amount (a feature vector including a plurality of feature amounts) from the extracted face area (face image). The image analysis unit 405 compares the calculated feature amount with a feature amount of a list stored in advance (a blacklist in which feature amounts of suspicious persons are described), and confirms whether the calculated feature amount is registered in the blacklist.

When the feature amount calculated from the field image (the feature amount of the person moving in the field) is registered in the blacklist, the image analysis unit 405 notifies the operation mode determination unit 403 of the presence of the suspicious person as an "image analysis result". Alternatively, in a case of confirming a plurality of suspicious persons, the image analysis unit 405 may notify the operation mode determination unit 403 of the number of suspicious persons as the "image analysis result".

For example, the image analysis unit 405 may execute analysis regarding whether a physically handicapped person or a pregnant female is present in the field. In this case, the image analysis unit 405 extracts a whole-body image of the person from the field image. Specifically, the image analysis unit 405 detects an area including the whole body of the person (whole body area) from the field image. Thereafter, the image analysis unit 405 extracts the whole-body image by cutting out the detected whole-body area from the field image.

The image analysis unit 405 compares the extracted whole-body image with a template prepared in advance to detect a physically handicapped person or the like. Alternatively, the image analysis unit 405 may detect a physically handicapped person or the like using a learning model generated by machine learning. For example, a large number of images of physically handicapped persons and the like to which labels are given is prepared as training data, and a learning model is generated using the training data. Any algorithm such as a support vector machine, boosting, or a neural network can be used to generate the learning model. A known technique can be used for the algorithm such as the support vector machine, and thus description thereof is omitted.

In the case of detecting a physically handicapped person or the like in the field, the image analysis unit 405 notifies the operation mode determination unit 403 of the detection as the "image analysis result". Alternatively, in the case of detecting a plurality of physically handicapped persons or the like, the image analysis unit 405 may notify the operation mode determination unit 403 of the number of the physically handicapped persons or the like as the "image analysis result".

The operation mode determination unit 403 is a means that switches the operation mode in the second terminal 20 based on the image analysis result acquired from the image analysis unit 405.

For example, when a suspicious person, a physically handicapped person, or the like is present in the field, the operation mode determination unit 403 increases the number of second terminals 20 operating with the non-face authentication setting. Alternatively, the operation mode determination unit 403 may set the operation modes of all the second terminals 20 to the non-face authentication setting.

Alternatively, the operation mode determination unit 403 may determine the operation mode of the second terminal 20 according to the number of suspicious persons, physically handicapped persons, or the like. For example, the operation mode determination unit 403 may increase the number of second terminals 20 operating with the non-face authentication setting as the number of suspicious persons or the like increases.

As described above, in the authentication system according to the second example embodiment, by analyzing the field image acquired from the camera device 40, it is possible to reinforce the security in the airport and provide the service suitable for the physically handicapped person or the like.

Figure 10:
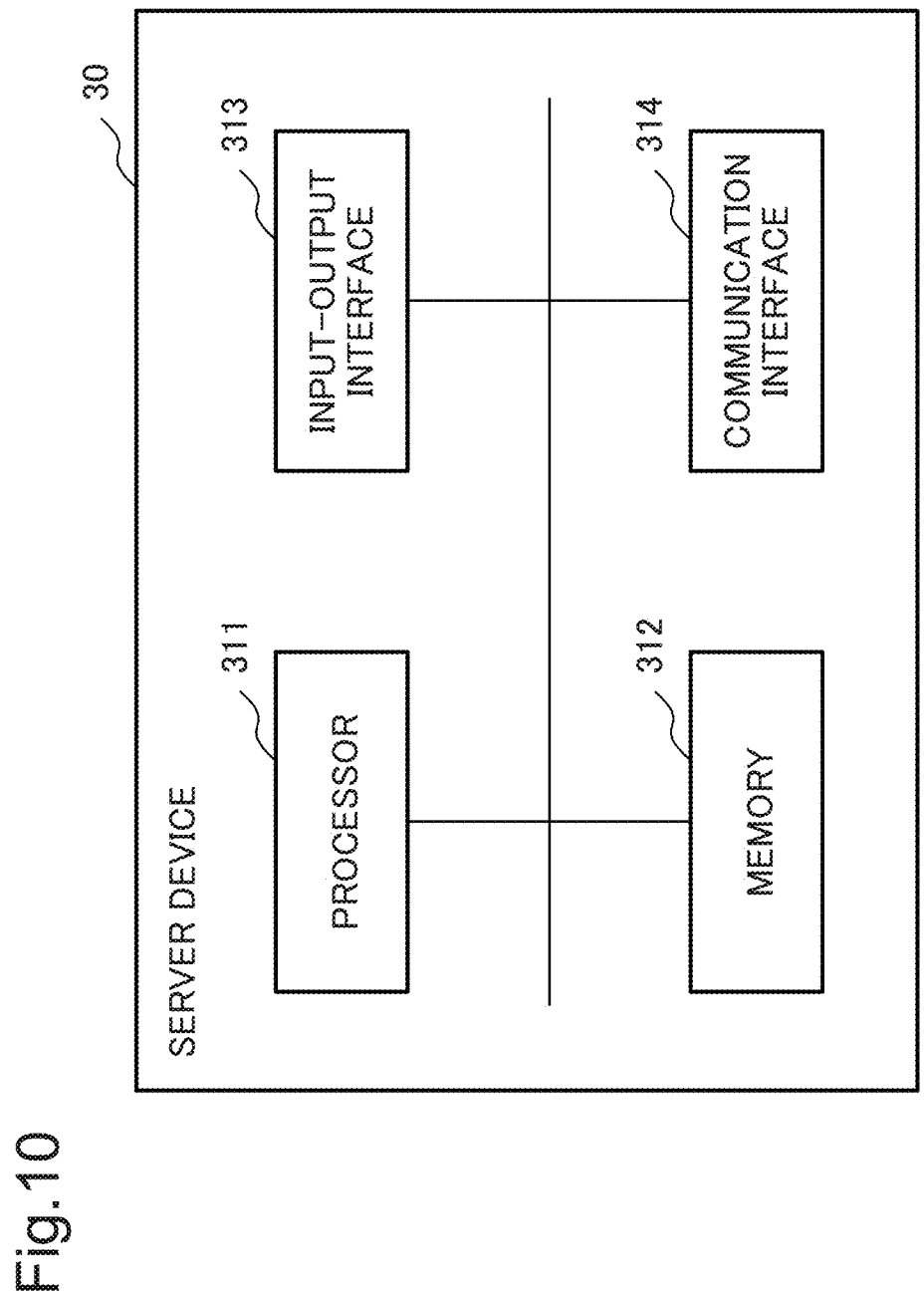
FIG. 10 is a diagram illustrating an example of a hardware configuration of the server device.

Next, hardware of each device constituting the authentication system will be described. FIG. 10 is a diagram illustrating an example of a hardware configuration of the server device 30.

The server device 30 can be configured by an information processing device (so-called computer), and has the configuration illustrated in FIG. 10. For example, the server device 30 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 10 is not intended to limit the hardware configuration of the server device 30. The server device 30 may include hardware (not illustrated) or may not include the input/output interface 313 as necessary. In addition, the numbers of processors 311 and the like included in the server device 30 are not limited to the example of FIG. 10, and for example, a plurality of the processors 311 may be included in the server device 30.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation of a keyboard or a mouse.

The communication interface 314 is a circuit, a module, or the like that communicates with another device. For example, the communication interface 314 includes a network interface card (NIC) or the like.

The functions of the server device 30 are implemented by various processing modules. The processing modules are implemented by, for example, the processor 311 executing a program stored in the memory 312. Furthermore, the program can be recorded in a computer-readable storage medium. The storage medium may be a non-transient (non-transitory) medium such as a semiconductor memory, a hard disk, a magnetic recording medium, or an optical recording medium. That is, the present disclosure can also be embodied as a computer program product. In addition, the program can be downloaded via a network or updated using a storage medium storing the program. Further, the processing module may be implemented by a semiconductor chip.

The first terminal 10 and the second terminal 20 can also be configured by an information processing device similarly to the server device 30, and since there is no difference in the basic hardware configuration from the server device 30, the description thereof will be omitted. The first terminal 10 and the second terminal 20 may include a camera device (camera module) or the like as necessary.

[Modification]

Note that the configuration, operation, and the like of the authentication system described in the above example embodiments are merely examples, and are not intended to limit the configuration and the like of the system.

For example, in the first example embodiment, the case where the authentication system includes the plurality of first terminals 10 has been described as an example, but it is sufficient that the authentication system includes one or more first terminals 10. In a case where one first terminal 10 is included in the authentication system, the first terminal 10 may be a hybrid terminal. That is, the first terminal 10 is configured to be able to perform both the service provision by the face authentication function and the service provision by the non-face authentication function without requiring a setting change. The first terminal 10 calculates the number of times of face authentication processing and the number of times of non-face authentication processing per unit time, and reports them to the server device 30. The server device 30 only needs to calculate the face authentication use rate using these numbers of times of processing.

In the above example embodiment, the case of using "face or face image" as the biometric information of the user has been described, but the biometric information available in the present disclosure is not limited to "face". In the present disclosure, another biometric information such as an iris can be used.

In the first example embodiment, the case of using the face authentication use rate as an index for grasping the use situation of the face authentication in the pre-stage terminal (the first terminal 10) has been described, but the use situation may be grasped by another index. For example, a non-face authentication use rate (a ratio of users for which the service is provided by the conventional procedure) in the first terminal 10 may be calculated. Since the face authentication use rate and the non-face authentication use rate are in an inextricable relationship, the non-face authentication use rate can be substantially regarded as the face authentication use rate.

In the first example embodiment, the second terminal 20 has been described as a subsequent-stage terminal, but the second terminal 20 may operate as a preceding-stage terminal depending on a system configuration. In this case, the second terminal 20 only needs to include the function of the first terminal 10. That is, a processing module corresponding to the "processing information generation unit 203" is mounted on the second terminal 20, and the processing information is transmitted from the second terminal 20 to the server device 30. The server device 30 may calculate the face authentication use rate (the use situation of the face authentication in the second terminal 20) based on the processing information transmitted from the second terminal 20 and determine the operation mode of the subsequent-stage terminal.

In the above example embodiment, the terminal that provides the service by the face authentication setting or the non-face authentication setting has been described as an example. However, in addition to the above two settings, the terminal may have a setting of a hybrid terminal that provides the service by both the face authentication and the non-face authentication. That is, the first terminal 10 and the second terminal 20 in the first example embodiment, and the second terminal 20 in the second example embodiment may be switchable among three operation modes of the face authentication setting, the non-face authentication setting, and the hybrid setting.

In the first example embodiment, the case where the number of second terminals 20 operating with the face authentication setting is determined by the table information as illustrated in FIG. 6 has been described. However, the number of second terminals may be determined using a predetermined function or the like. For example, a function using the face authentication use rate as input and the number of second terminals 20 operating with the face authentication setting as output may be defined in advance, and the number of second terminals 20 operating with the face authentication setting may be determined using the function.

Alternatively, the number of second terminals 20 operating with an optimum face authentication setting for each face authentication use rate may be prepared in advance as training data, and the number of second terminals 20 operating with the face authentication setting may be calculated using a learning model constructed using the training data. Any algorithm such as a support vector machine, boosting, or a neural network can be used to generate the learning model. A known technique can be used for the algorithm such as the support vector machine, and thus description thereof is omitted.

The server device 30 may change the setting of the first terminal group based on the face authentication use rate in the first terminal group.

By installing a terminal operation determination program in the storage unit of the computer, the computer can be caused to function as the server device 30. Further, a terminal operation determination method can be executed by the computer by causing the computer to execute the terminal operation determination program.

In the flowcharts (flowchart and sequence diagram) used in the above description, a plurality of steps (processes) is described in order, but the execution order of the steps executed in the example embodiments is not limited to the described order. In the example embodiments, for example, the order of the illustrated steps can be changed in a range including no trouble in terms of content, such as executing the processes in parallel.

The above example embodiments have been described in detail in order to facilitate understanding of the present disclosure, and it is not intended that all the configurations described above are necessary. In addition, in the case where a plurality of example embodiments has been described, the example embodiment may be used alone or in combination. For example, a part of the configuration of the example embodiment can be replaced with the configuration of another example embodiment, or the configuration of another example embodiment can be added to the configuration of the example embodiment. Furthermore, another configuration may be added to, deleted from, or replaced with another configuration a part of the configuration of the example embodiment.

Although the industrial applicability of the present disclosure is apparent from the above description, the present disclosure is suitably applicable to an authentication system and the like in an airport.

Some or all of the above example embodiments can be described as but are not limited to the following supplementary notes.

[Supplementary Note 1]

An authentication system including:

at least one or more first terminals (10 or 101) capable of providing a service by a biometric authentication function or a non-biometric authentication function;

a plurality of second terminals (20 or 102) each capable of switching a biometric authentication function and a non-biometric authentication function and capable of providing a service by the biometric authentication function or the non-biometric authentication function; and a server device (30 or 103) connected to the at least one or more first terminals (10 or 101) and the plurality of second terminals (20 or 102), wherein the server device (30 or 103)

calculates a use rate of the biometric authentication function in the at least one or more first terminals (10 or 101), and determines an operation mode of at least one or more second terminals among the plurality of second terminals (20 or 102) in accordance with the calculated use rate.

[Supplementary Note 2]

The authentication system according to supplementary note 1, in which the server device (30 or 103) determines the number of second terminals that provides the service by the biometric authentication function among the plurality of second terminals (20 or 102).

[Supplementary Note 3]

The authentication system according to supplementary note 1 or 2, in which the server device (30 or 103)

selects a second terminal that requires switching between the biometric authentication function and the non-biometric authentication function among the plurality of second terminals (20 or 102) in accordance with the use rate, and transmits a setting switching notification to the selected second terminal (20 or 102).

[Supplementary Note 4]

The authentication system according to any one of supplementary notes 1 to 3, in which
a plurality of the first terminals (10 or 101) is included, and
each of the plurality of first terminals (10 or 101) generates processing information including the number of users for which the service by the biometric authentication function has been provided or the number of users for which the service by the non-biometric authentication function has been provided, per unit time.

[Supplementary Note 5]

The authentication system according to supplementary note 4, in which each of the plurality of first terminals transmits (10 or 101) the processing information to the server device (30 or 103).

[Supplementary Note 6]

The authentication system according to supplementary note 5, in which the server device (30 or 103) counts the processing information acquired from each of the plurality of first terminals (10 or 101) and calculates the use rate.

[Supplementary Note 7]

The authentication system according to supplementary note 6, in which the server device (30 or 103) calculates the use rate in accordance with a total number of users processed per unit time by the first terminal (10 or 101) that provides the service by the biometric authentication function among the plurality of first terminals (10 or 101) and a total number of users processed per unit time by the first terminal (10 or 101) that provides the service by the non-biometric authentication function among the plurality of first terminals (10 or 101).

[Supplementary Note 8]

The authentication system according to supplementary note 7, in which the server device (30 or 103) calculates the use rate by dividing a total number of users for which the service by the biometric authentication function has been provided by a sum of the total number of users for which the service by the biometric authentication function has been provided and a total number of users for which the service by the non-biometric authentication function has been provided.

[Supplementary Note 9]

The authentication system according to any one of supplementary notes 1 to 8, wherein the plurality of second terminals (20 or 102) is terminals installed at a subsequent stage of the at least one or more first terminals (10 or 101).

[Supplementary Note 10]

The authentication system according to any one of supplementary notes 1 to 9, in which the at least one or more first terminals (10 or 101) are terminals that execute processing related to a check-in procedure.

[Supplementary Note 11]

The authentication system according to any one of supplementary notes 1 to 10, wherein the plurality of second terminals (20 or 102) is terminals that execute processing related to a security check.

[Supplementary Note 12]

A method including:
in an authentication system including
at least one or more first terminals (10 or 101) capable of providing a service by a biometric authentication function or a non-biometric authentication function,
a plurality of second terminals (20 or 102) each capable of switching a biometric authentication function and a non-biometric authentication function and capable of providing a service by the biometric authentication function or the non-biometric authentication function, and
a server device (30 or 103) connected to the at least one or more first terminals (10 or 101) and the plurality of second terminals (20 or 102),
calculating a use rate of the biometric authentication function in the at least one or more first terminals (10 or 101); and
determining an operation mode of at least one or more second terminals among the plurality of second terminals (20 or 102) in accordance with the calculated use rate.

[Supplementary Note 13]

A computer-readable recording medium recording a program for causing a computer (311) mounted on a server device (30 or 103) connected to at least one or more first terminals (10 or 101) and a plurality of second terminals (20 or 102) to execute:
the at least one or more first terminals (10 or 101) capable of providing a service by a biometric authentication function or a non-biometric authentication function, and
the plurality of second terminals (20 or 102) each capable of switching a biometric authentication function and a non-biometric authentication function and capable of providing a service by the biometric authentication function or the non-biometric authentication function,
processing of calculating a use rate of the biometric authentication function in the at least one or more first terminals (10 or 101); and
processing of determining an operation mode of at least one or more second terminals among the plurality of second terminals (20 or 102) in accordance with the calculated use rate.

Note that the form of the supplementary note 12 and the form of the supplementary note 13 can be developed into the form of the supplementary note 2 to the form of the supplementary note 11, similarly to the form of the supplementary note 1.

The disclosures of the cited prior art documents are incorporated herein by reference. Although the example embodiments of the present disclosure have been described, the present disclosure is not limited to these example embodiments. It will be understood by those skilled in the art that these example embodiments are exemplary only and that various modifications are possible without departing from the scope and spirit of the present disclosure. That is, it goes without saying that the present disclosure includes various modifications and corrections that can be made by those skilled in the art in accordance with the entire disclosure including the claims and the technical idea.

REFERENCE SIGNS LIST

10, 10-1 to 10-3, 101 First terminal
20, 20-1 to 20-3, 102 Second terminal
30, 103 Server device
40, 40-1 to 40-K Camera device
201, 301, 401 Communication control unit
202, 302 Terminal function implementation unit
203 Processing information generation unit
204, 304, 404 Storage unit
303 Operation mode switching unit 311 Processor
312 Memory
313 Input/output interface
314 Communication interface
402 Face authentication use rate calculation unit
403 Operation mode determination unit
405 Image analysis unit

What is claimed is:

1. An authentication system comprising:
at least one or more first terminals capable of providing a service by a biometric authentication function or a non-biometric authentication function, the at least one or more first terminals are one or more preceding-stage terminals located upstream of the authentication system;
a plurality of second terminals each capable of switching a biometric authentication function and a non-biometric authentication function and capable of providing a service by the biometric authentication function or the non-biometric authentication function in accordance with a use rate of the biometric authentication function in the at least one or more first terminals, the second terminals are subsequent-stage terminals located downstream of the authentication system; and
a server device connected to the at least one or more first terminals and the plurality of second terminals, wherein
the server device
calculates a use rate of the biometric authentication function in the at least one or more first terminals, and
determines an operation mode of at least one or more second terminals among the plurality of second terminals in accordance with the calculated use rate.

2. The authentication system according to claim 1, wherein the server device determines the number of second terminals that provides the service by the biometric authentication function among the plurality of second terminals.

3. The authentication system according to claim 1, wherein the server device
selects a second terminal, in accordance with the use rate, that requires switching between the biometric authentication function and the non-biometric authentication function among the plurality of second terminals, and
transmits a setting switching notification to the selected second terminal.

4. The authentication system according to claim 1, wherein a plurality of the first terminals is included, and each of the plurality of first terminals generates processing information including the number of users for which the service by the biometric authentication function has been provided or the number of users for which the service by the non-biometric authentication function has been provided, per unit time.

5. The authentication system according to claim 4, wherein each of the plurality of first terminals transmits the processing information to the server device.

6. The authentication system according to claim 5, wherein the server device calculates the processing information acquired from each of the plurality of first terminals and calculates the use rate.

7. The authentication system according to claim 6, wherein the server device calculates the use rate in accordance with a total number of users processed per unit time by the first terminal that provides the service by the biometric authentication function among the plurality of first terminals and a total number of users processed per unit time by the first terminal that provides the service by the non-biometric authentication function among the plurality of first terminals.

8. The authentication system according to claim 7, wherein the server device calculates the use rate by dividing a total number of users for which the service by the biometric authentication function has been provided by a sum total number, the sum total number being a sum of the total number of users for which the service by the biometric authentication function has been provided and a total number of users for which the service by the non-biometric authentication function has been provided.

9. The authentication system according to claim 1, wherein the plurality of second terminals are terminals installed at a subsequent stage of the at least one or more first terminals.

10. The authentication system according to claim 1, wherein the at least one or more first terminals are terminals that execute processing related to a check-in procedure.

11. The authentication system according to claim 1, wherein the plurality of second terminals are terminals that execute processing related to a security check.

12. A method comprising:
in an authentication system including
at least one or more first terminals capable of providing a service by a biometric authentication function or a non-biometric authentication function, the at least one or more first terminals are one or more proceding-stage terminals located upstream of the authentication system;
a plurality of second terminals each capable of switching a biometric authentication function and a non-biometric authentication function and capable of providing a service by the biometric authentication function or the non-biometric authentication function in accordance with a use rate of the biometric authentication function in the at least one or more first terminals, the second terminals are subsequent-stage terminals located downstream of the authentication system, and
a server device connected to the at least one or more first terminals and the plurality of second terminals,
calculating a use rate of the biometric authentication function in the at least one or more first terminals; and
determining an operation mode of at least one or more second terminals among the plurality of second terminals in accordance with the calculated use rate.

13. A non-transitory computer-readable recording medium recording a program for causing a computer mounted on a server device connected to at least one or more first terminals and a plurality of second terminals to execute:
the at least one or more first terminals capable of providing a service by a biometric authentication function or a non-biometric authentication function, the at least one or more first terminals are one or more preceding-stage terminals located upstream of an authentication system, and
the plurality of second terminals each capable of switching a biometric authentication function and a non-biometric authentication function and capable of providing a service by the biometric authentication function or the non-biometric authentication function in accordance with a use rate of the biometric authentication function in the at least one or more first terminals, the second terminals are subsequent-stage terminals located downstream of the authentication system, processing of calculating a use rate of the biometric authentication function in the at least one or more first terminals; and processing of determining an operation mode of at least one or more second terminals among the plurality of second terminals in accordance with the calculated use rate.

14. The authentication system according to claim 1, wherein the one or more first terminals and the one or more second terminals are both along a path from the one or more first terminals to a gate of the one or more second terminals, and wherein the one or more preceding-stage terminals are located upstream of the authentication system by being at one or more positions along the path that is away from the gate of the one or more second terminals, and wherein the subsequent-stage terminals are located downstream of the authentication system by a position of the at least one of the subsequent-stage terminals being at the gate.

* * * * *